(12) United States Patent
Sampsell

(10) Patent No.: US 8,243,014 B2
(45) Date of Patent: Aug. 14, 2012

(54) METHOD AND SYSTEM FOR REDUCING POWER CONSUMPTION IN A DISPLAY

(75) Inventor: Jeffrey B. Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 510 days.

(21) Appl. No.: 12/463,877

(22) Filed: May 11, 2009

(65) Prior Publication Data

US 2009/0225069 A1    Sep. 10, 2009

Related U.S. Application Data

(62) Division of application No. 11/097,827, filed on Apr. 1, 2005, now Pat. No. 7,532,195.

(60) Provisional application No. 60/613,404, filed on Sep. 27, 2004.

(51) Int. Cl.
*G09G 3/34* (2006.01)
(52) U.S. Cl. .................................. 345/108; 345/698
(58) Field of Classification Search .................. 345/108, 345/204, 698, 699, 87, 76; 359/245
See application file for complete search history.

(56) References Cited

U.S. PATENT DOCUMENTS

| | | | |
|---|---|---|---|
| 4,709,995 A | 12/1987 | Kuribayashi et al. | |
| 4,954,789 A | 9/1990 | Sampsell | |
| 5,055,833 A | 10/1991 | Hehlen et al. | |
| 5,227,900 A | 7/1993 | Inaba et al. | |
| 5,285,196 A | 2/1994 | Gale | |
| 5,572,251 A * | 11/1996 | Ogawa | 348/207.99 |
| 5,699,075 A | 12/1997 | Miyamoto | |
| 5,726,675 A | 3/1998 | Inoue | |
| 5,754,160 A | 5/1998 | Shimizu et al. | |
| 5,771,116 A | 6/1998 | Miller et al. | |
| 5,784,189 A | 7/1998 | Bozler et al. | |
| 5,828,367 A | 10/1998 | Kuga | |
| 5,912,758 A | 6/1999 | Knipe et al. | |
| 5,929,831 A | 7/1999 | Aratani et al. | |
| 5,991,883 A | 11/1999 | Atkinson | |
| 6,040,937 A | 3/2000 | Miles | |

(Continued)

FOREIGN PATENT DOCUMENTS

EP    0 295 802    12/1988

(Continued)

OTHER PUBLICATIONS

Notice of Reasons for Rejection dated Sep. 29, 2009 in Japanese App. No. 2005-266792.

(Continued)

*Primary Examiner* — Stephen Sherman
(74) *Attorney, Agent, or Firm* — Knobbe Martens Olson & Bear, LLP

(57) ABSTRACT

A method and system for reducing power consumption in a display includes driving a display comprising a plurality of display elements characterized by a display state. In a first mode of operation, the display state of substantially all the display elements is periodically re-set so as to display a first series of image frames. Upon changing to a second mode of operation, a second mode of operations comprises re-setting the display state of only a portion of the display elements so as to display a second series of image frames at a display element resolution which is less than said display element resolution used to display said first series of image frames.

32 Claims, 6 Drawing Sheets

U.S. PATENT DOCUMENTS

| | | | |
|---|---|---|---|
| 6,327,071 B1 | 12/2001 | Kimura | |
| 6,356,254 B1 | 3/2002 | Kimura | |
| 6,507,330 B1 | 1/2003 | Handschy et al. | |
| 6,507,331 B1 | 1/2003 | Schlangen et al. | |
| 6,574,033 B1 | 6/2003 | Chui et al. | |
| 6,636,187 B2 | 10/2003 | Tajima et al. | |
| 6,674,562 B1 | 1/2004 | Miles et al. | |
| 6,680,792 B2 | 1/2004 | Miles | |
| 6,762,873 B1 | 7/2004 | Coker et al. | |
| 7,034,783 B2 | 4/2006 | Gates et al. | |
| 7,057,610 B2 | 6/2006 | Kataoka et al. | |
| 7,123,216 B1 | 10/2006 | Miles | |
| 7,161,728 B2 | 1/2007 | Sampsell et al. | |
| 7,400,489 B2 | 7/2008 | Van Brocklin et al. | |
| 7,499,208 B2 | 3/2009 | Mignard | |
| 7,515,147 B2 | 4/2009 | Mignard | |
| 7,532,195 B2 | 5/2009 | Sampsell | |
| 7,560,299 B2 | 7/2009 | Cummings | |
| 2001/0026250 A1 | 10/2001 | Inoue et al. | |
| 2001/0034075 A1 | 10/2001 | Onoya | |
| 2001/0040536 A1 | 11/2001 | Tajima et al. | |
| 2001/0052887 A1 | 12/2001 | Tsutsui et al. | |
| 2002/0012159 A1 | 1/2002 | Tew | |
| 2002/0093722 A1 | 7/2002 | Chan et al. | |
| 2002/0140685 A1 | 10/2002 | Yamamoto et al. | |
| 2002/0167473 A1 * | 11/2002 | Johnson et al. | 345/76 |
| 2002/0190940 A1 | 12/2002 | Itoh et al. | |
| 2003/0020699 A1 | 1/2003 | Nakatani et al. | |
| 2003/0122773 A1 | 7/2003 | Washio et al. | |
| 2003/0137215 A1 | 7/2003 | Cabuz | |
| 2003/0137521 A1 | 7/2003 | Zehner et al. | |
| 2003/0184189 A1 | 10/2003 | Sinclair | |
| 2004/0021658 A1 | 2/2004 | Chen | |
| 2004/0136596 A1 | 7/2004 | Oneda et al. | |
| 2004/0145553 A1 | 7/2004 | Sala et al. | |
| 2004/0189681 A1 | 9/2004 | Itakura et al. | |
| 2005/0024301 A1 | 2/2005 | Funston | |
| 2009/0273596 A1 | 11/2009 | Cummings | |

FOREIGN PATENT DOCUMENTS

| | | |
|---|---|---|
| EP | 0 300 754 | 1/1989 |
| EP | 0 703 562 | 3/1996 |
| EP | 0 911 794 | 4/1999 |
| EP | 1 134 721 | 9/2001 |
| EP | 1 239 448 | 9/2002 |
| EP | 1 280 129 | 1/2003 |
| EP | 1 414 011 | 4/2004 |
| JP | 2000-075963 | 4/2000 |
| JP | 2001-136425 | 5/2001 |
| JP | 2003-023490 | 1/2003 |
| JP | 2004-191876 | 8/2004 |
| WO | WO 02/089103 | 11/2002 |
| WO | WO 03/079323 | 9/2003 |
| WO | WO 2004/054088 | 6/2004 |

OTHER PUBLICATIONS

Final Notice of Rejection dated Jun. 15, 2010 in Japanese App. No. 2005-266792.
Notice of Reasons for Rejection dated Feb. 23, 2010 in Japanese App. No. 2005-266792.
Chen et al., Low peak current driving scheme for passive matrix-OLED, SID International Symposium Digest of Technical Papers, May 2003, pp. 504-507.
Miles, MEMS-based interferometric modulator for display applications, Part of the SPIE Conference on Micromachined Devices and Components, vol. 3876, pp. 20-28 (1999).
Miles et al., 5.3: Digital Paper™: Reflective displays using interferometric modulation, SID Digest, vol. XXXI, 2000 pp. 32-35.
Miles, "Interferometric Modulation: MOEMS as an Enabling Technology for High-Performance Reflective Displays," Proceedings of the International Society for Optical Engineering, San Jose, CA, vol. 49085, pp. 131-139 (Jan. 28, 2003).
Partial European Search Report for App. No. 05255664.4, dated May 7, 2008.
Extended European Search Report for App. No. 05255664.4, dated Aug. 11, 2008.
Official Action dated May 15, 2008 in Mexican App. No. 5010239.
Office Action dated May 15, 2008 in U.S. Appl. No. 11/097,827.
Office Action dated Oct. 31, 2008 in U.S. Appl. No. 11/097,827.
Office Action in Chinese App. No. 2005101050475, received Jul. 2, 2009.
Office Action in Chinese App. No. 2005101050475, received Jul. 4, 2008.
Office Action in Chinese App. No. 2005101050475, received Dec. 4, 2008.
Office Action in Chinese App. No. 2005101050475, received Feb. 20, 2009.
Official Communication dated Jul. 29, 2011 for App. No. 05255664.4.
Notice to Submit a Response dated Apr. 12, 2012 in Korean App. No. 10-2012-0004899.

* cited by examiner

METHOD AND SYSTEM FOR REDUCING POWER CONSUMPTION IN A DISPLAY

RELATED APPLICATIONS

This application is a divisional application of U.S. patent application Ser. No. 11/097,827, filed Apr. 1, 2005, titled "METHOD AND SYSTEM FOR REDUCING POWER CONSUMPTION IN A DISPLAY," now issued as U.S. Pat. No. 7,532,195, which claims the benefit of U.S. Provisional Application No. 60/613,404, filed Sep. 27, 2004, titled "METHOD AND DEVICE FOR REDUCING POWER IN INTERFEROMETRIC MODULATION ARRAY." Each of the foregoing applications is hereby expressly incorporated by reference in its entirety.

BACKGROUND

Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices.

One embodiment is a method of updating a display. The display includes a plurality of display elements characterized by a display state. The method includes, in a first mode of operation, periodically re-setting the display state of substantially all the display elements at a first frame update rate so as to display a first series of image frames. The method further includes changing to a second mode of operation. The second mode of operation comprises periodically re-setting the display state of only a portion of the display elements at a second frame update rate so as to display a second series of image frames at a display element resolution which is less than the display element resolution used to display the first series of image frames. The method further includes periodically re-setting said display state of a remaining portion of said display elements at a third rate that is less than said second frame update rate.

Another embodiment includes a system for displaying image data. The system includes a display device having a plurality of operational modes, at least some of the operational modes corresponding to reduced display element resolution when displaying image data on a display. The system further includes a source of image data configured to provide image data to said display device at a data rate that depends at least in part on which of the plurality of operational modes the display device is operating.

Another embodiment is a method of updating a display. The method includes applying a series of row voltage strobes to a first set of rows of display elements during a display write operation so as to configure display elements in said first set of rows to a selected state. The method further includes skipping subsequent row voltage strobes to said first set of rows during subsequent display write operations that configure the remaining rows of the display in accordance with received display data.

Another embodiment includes a method of updating a display. The method includes applying a set of column voltages to a first set of columns of display elements during a display write operation so as to configure display elements in said first set of columns to a selected state. The method further includes skipping subsequent column transitions to said first set of columns during subsequent display write operations that configure the remaining columns of the display in accordance with received display data.

Another embodiment includes a method for displaying image data. The method includes re-setting a plurality of display elements in a first mode of operation to display image data. The method further includes re-setting less than all of the plurality of display elements in a second mode of operation to display image data, where the second mode corresponds to a reduced display element resolution. The method additionally includes receiving image data for display at a data rate that depends at least in part on the mode of operation being used.

Another embodiment includes a method of providing image data for display. The method includes receiving data describing a current display mode being used by a display device, wherein the current display mode includes updating display states of less than all display elements in the display device. The method further includes filtering image data for display on the display device. The method also includes sending the filtered image data over a communications network, wherein the filtering comprises filtering the image data so that image data for non-updated display elements is not sent.

Another embodiment includes an apparatus for displaying image data. The apparatus includes an array of display elements having a plurality of operational modes, at least some of the operational modes corresponding to reduced display element resolution when displaying image data using the array. The apparatus further includes a network interface configured to receive information from a content server over a communications network. The apparatus also includes an array controller configured to provide data to the array based on the information received from the content server.

DETAILED DESCRIPTION OF PREFERRED EMBODIMENTS

One embodiment is a method of driving a display so as to reduce power consumption of the display that includes a plurality of display elements. In a first mode of operation, the display state of substantially all the display elements is periodically re-set so as to display a first series of image frames. Upon changing to a second mode of operation, a second mode of operations comprises re-setting the display state of only a first portion of the display elements so as to display a second series of image frames at a display element resolution which is less than said display element resolution used to display said first series of image frames. The reduced display element resolution may reduce the color gamut of the display. In one embodiment, the display state of the remaining portion of the display elements is re-set at a rate that is lower than the rate of re-setting the first portion.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
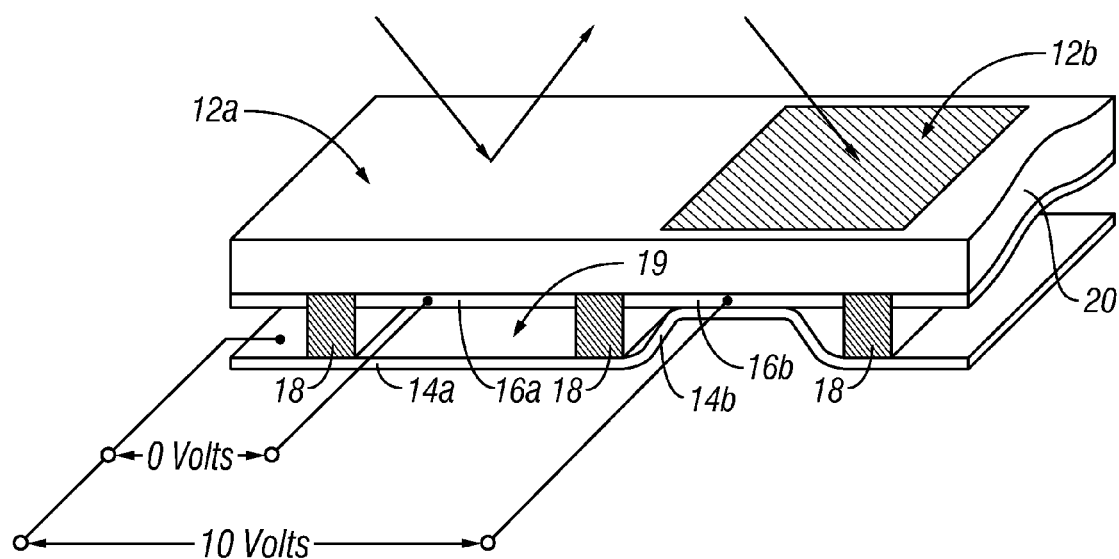
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
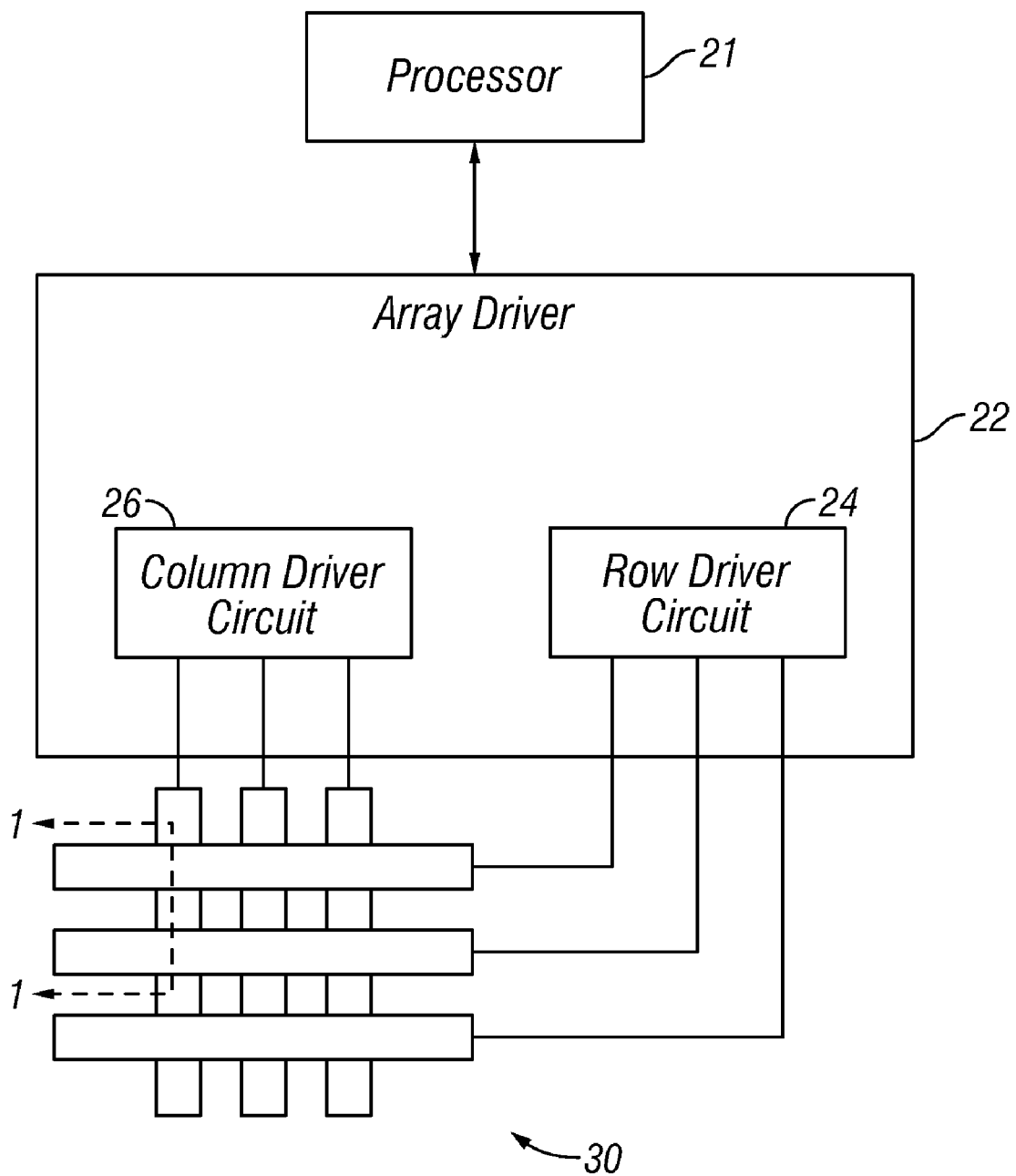
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
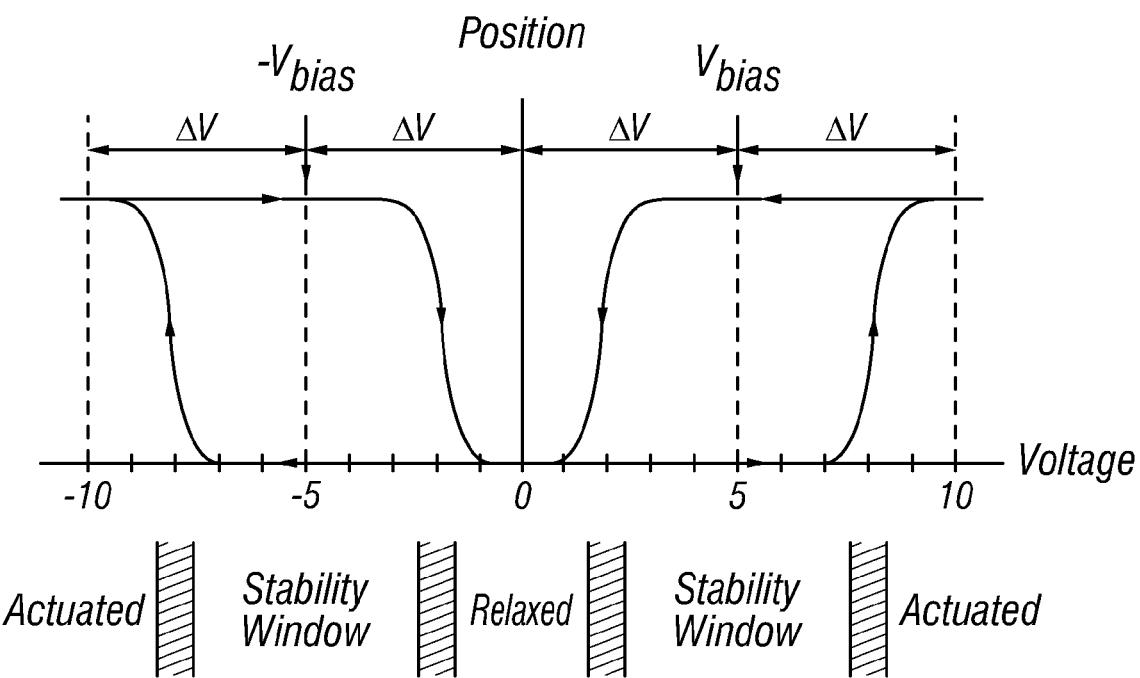
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel can involve setting the appropriate column to $-V_{bias}$, and the appropriate row to $+\Delta V$, which may correspond to −5 volts and +5 volts respectively. Releasing the pixel can be accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
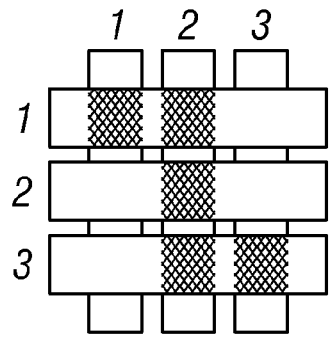
FIGS. 5A and 5B illustrate one exemplary timing diagram for row and column signals that may be used to write a frame of display data to the 3×3 interferometric modulator display of FIG. 2.
Figure 5B:
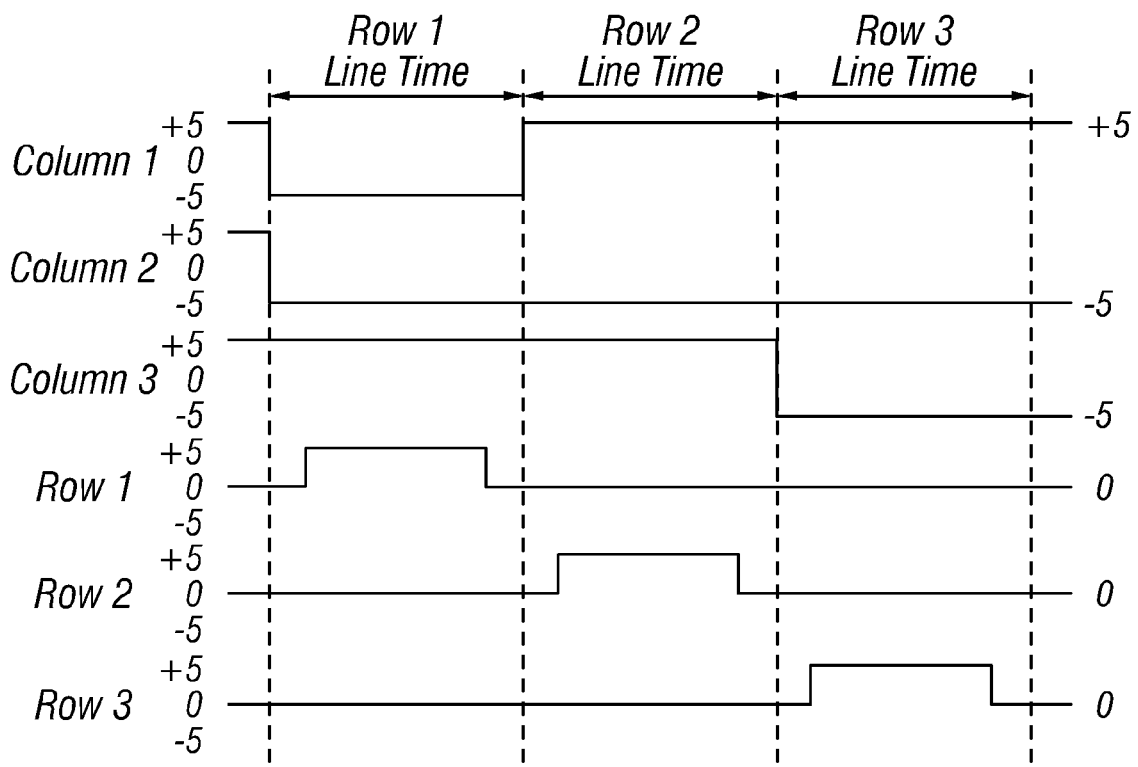

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To configure row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly configured by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
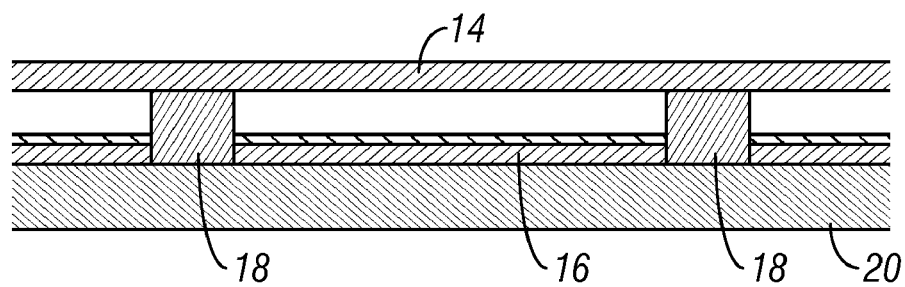
FIG. 6A is a cross section of the device of FIG. 1.
Figure 6B:
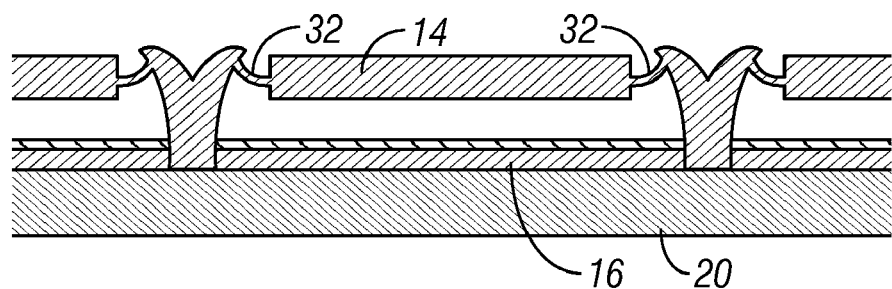
FIG. 6B is a cross section of an alternative embodiment of an interferometric modulator.
Figure 6C:
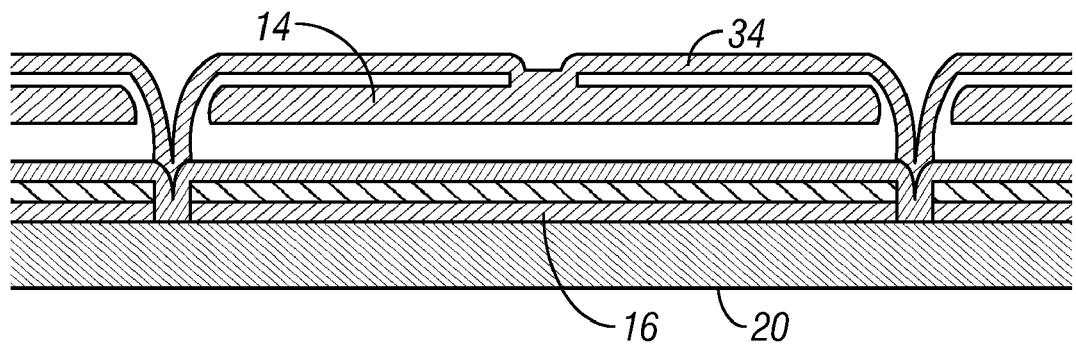
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Data describing a monochrome display image may include one bit of data per pixel. One embodiment of a monochrome display includes one interferometric modulator per pixel, the on or off state of the modulator being set based on the value of the one bit of data per pixel. A greyscale image may include several bits of data per pixel. For example, a "3 bit" greyscale display includes 3 bits of data per pixel that correspond to one of eight shades of gray that may be assigned to each pixel. One embodiment of a display for displaying an exemplary 3 bit grayscale image includes three interferometric modulators for each pixel. To obtain the eight shades, the three modulators reflect light according to a ratio of 1:2:4. In one such embodiment, each of the interferometric modulators includes mirrors having a reflective surface area that varies according to the ratio of 1:2:4. A particular shade in a pixel is obtained in such an embodiment by setting each modulator to an on or off state based on the binary value of a corresponding bit of the 3 bits of data. One embodiment of a color display works similarly except that the color display includes a group of red, green, and blue interferometric modulators. For example, in a 12-bit color display, 4 of the 12 bits correspond to each of 16 intensities of red, green, and blue which are produced by red, green, or blue interferometric modulators. Such greyscale or color displays thus have more display elements to address than does a monochrome display.

As discussed briefly above, power consumption in an interferometric modulator display is a function of changing the state of the interferometric modulator display elements in the display. Thus, power consumption of such a display can be varied by changing the frequency of updates of the display elements. In addition, color or greyscale interferometric modulator displays that have pixels, or rows of pixels subdivided into sets of interferometric modulators, tend to have increased power consumption as compared to monochrome displays because of the increased number of interferometric modulators in such displays.

One way of reducing power consumption in an interferometric display is to reduce the frequency of updates of the display elements in the display. In particular, it has been found that in a greyscale or color display, the display elements corresponding to the least significant bits of greyscale or color shade data can be updated at a lower rate than the remaining display elements to reduce power consumption of the display.

Figure 7:
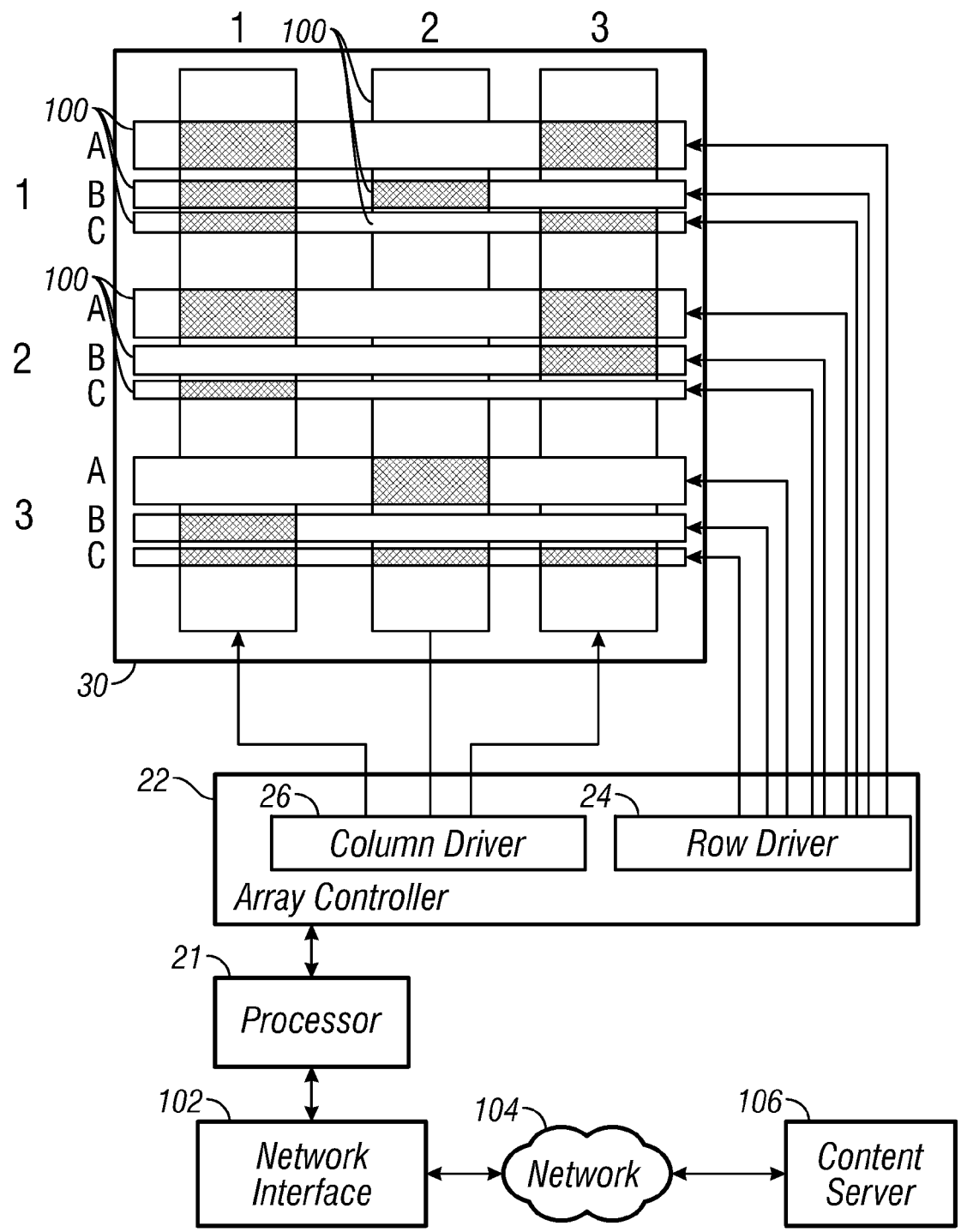
FIG. 7 is a partial system block diagram of an exemplary interferometric modulator display, similar to that illustrated in FIG. 2.

FIG. 7 is a partial schematic diagram of an exemplary interferometric modulator display, similar to that shown in FIG. 2. In the embodiment of FIG. 7, each of the rows of the pixel array 30 is subdivided into three subrows, A, B, and C. Each of the subrows defines one interferometric modulator display element 100 at each column. The subrows are each connected to the row driver 24. As compared to FIG. 2, the row driver 24 thus includes additional connections to the subrows to drive the color or greyscale pixel array 30. In FIG. 7, the display elements 100 are each illustrated in exemplary reflecting (white) or absorbing (hashed) states.

In the embodiment of FIG. 7, the processor 21 is in communication with a network interface 102 that communicates over a network 104 with a content server 106. The network interface 102 may support communication over any suitable data communications network. In one embodiment, the network interface 102 is a cellular radio transceiver that supports a code division multiple access (CDMA), or other wireless voice and/or data communications protocol such as time division multiple access (TDMA), frequency division multiple access (FDMA), or Global System for Mobile Communications (GSM). In other embodiments, the network interface 102 may support one or more additional, or alternative, radio interface protocols such as Bluetooth, IEEE 802.11, or other wireless protocols. In one embodiment, the network interface 102 supports a wired data interface, such as Ethernet, a serial port, a universal serial bus (USB) port, Firewire, IEEE 1394, a synchronization cradle coupled to a network or other computing device, or an interface to a GPS receiver.

The network 104 may include an Internet Protocol (IP) network, wireless networks, or any other suitable data communications network. The content server 106 may include any suitable computer system configured to transmit image data, including motion picture data in any format suitable for transmission over the network 106.

In one embodiment, the array controller 22 controls the rate of update of the display elements 100. The processor 21 may configure the refresh rate of the array controller 22. In one embodiment, the array controller is configured to operate in two or more modes of update. In one mode, each of the rows of the pixel array 30 is updated using a method such as described above with reference to FIG. 5B. In a second mode, at least one of the subrows is updated at a lower frequency. For example, in one embodiment, in the second mode, subrows A and B are updated 30 times a second and the remaining rows, e.g., subrow C is updated only once a second. Thus, power consumption is reduced with the tradeoff of lower color resolution and, thus, color gamut in the second mode. In another embodiment, the lower frequency of updating the remaining rows, e.g., row C, is very low, e.g., only when the display is initialized, or when the mode changes.

In one embodiment, the array controller 22 is configured to update the rows and subrows of display elements 100 by applying a series of row voltage strobes to each subrow to configure the state of the subrow. In one embodiment, in the second mode, the array controller 22 is configured to skip row voltage strobes for some of the subrows. For example, in one embodiment, in the first mode, the array controller 22 applies a series of row voltage strobes to each of the subrows A, B, and C of each row. When switched to the second mode, the array control 22 applies the row voltage strobes to subrows A and B of each row but skips subrow C. In one embodiment, as available battery power becomes lower, the array controller 22 skips more subrows, for example, by applying row voltage strobes to subrows A but skipping subrows B and C of each of the rows. In one embodiment, the array controller 22 applies a series of row voltage strobes to configure the states the non-updated subrows to a selected state, e.g., non-reflecting, upon entering the second mode. In one embodiment, the array controller 22 maintains the non-updated subrows in the selected state by applying a bias voltage across the display elements 100 of such subrows. In another embodiment, the array controller 22 periodically applies row voltage strobes to the otherwise non-updated subrows in the second mode to configure the state of the display elements 100 in such subrows to a new selected state. For example, the array controller 22 periodically fails to skip the subrows C and updates the display elements 100 in the subrows C to a new selected state. This periodic application of row voltage strobes to the otherwise non-updated subrows may be at a frequency much lower than the frequency of application of row voltage strobes to the other subrows. In one embodiment, the lower frequency period is non-constant. In one embodiment, the lower frequency period is based on image data and varies based on the image data.

In one embodiment, the display elements 100 of the subrows that are updated at the lower frequency, e.g., row C in the exemplary embodiment, are all set to the same state. In one such embodiment, the display elements of the less frequently updated subrows are set to a non-reflecting state. In another embodiment, the less frequently updated subrows are set to display an overall average visual shade of grey or color that may, for example, be based on an average brightness or color for some or all display elements 100 calculated over one or more image frame or frame portions.

In another embodiment, the display state of the less frequently updated subrows of display elements is based on particular portions of the image data stream. For example, motion video data, e.g., MPEG data, comprises reference frames describing all pixels that are sent relatively infrequently and intervening data frames that update only a portion of the pixels in the video image. In one embodiment, the less frequently updated subrows may be updated only when reference frames are displayed, and may be held at a particular state until the next reference frame is received. The particular state may be a calculated state, as described above, or the actual state for the less frequently updated display elements 100 in the reference state.

In one embodiment, additional modes may include updating a different number of subrows at different frequencies. For example, in one embodiment, in a first mode each of subrows A, B, and C is updated at a first rate; in a second mode, subrow A and B are updated at a first rate and subrow C at a lower rate, or at varying rate, such as described above based on receiving video reference data frames; and in a third mode, subrow A is updated at a first rate, subrow B at a second rate, and subrow C at a third rate. It is to be recognized that in embodiments with more subrows, additional modes of operation may be defined to have varying power consumption properties.

In one embodiment, the array controller 22 changes the display mode when available power level conditions, such as from a battery (not shown) providing power to the array 30, fall below a threshold level, or satisfy other predetermined conditions. In one embodiment, the processor 21 determines when to change display mode and signals the array controller 22 to change operational mode. In another embodiment, a user of an electronic device that contains the pixel array 30 may trigger the change to a different mode manually, or may configure the device to switch between modes under predetermined conditions.

In is to be recognized that while certain embodiments are discussed herein with respect to reducing display resolution by skipping row strobes, in other embodiments, updates of particular columns may be skipped to reduce power consumption. For example, in one such embodiment, rather than transitioning column voltages as image data for a given column changes from row to row, the voltage applied to some columns may be held at a potential that maintains the display elements of the skipped columns in an actuated or released state. In the embodiment of FIG. 5, for example, the columns in which column transitions are skipped can be held at a constant 0 V-5 V to remain released during frame updates, or at a constant 10 V-15 V to remain activated during frame updates.

In one embodiment, the image data being displayed by the display array 30 includes data being received over the network 104 from the content server 106. In one embodiment, the processor 21 communicates data describing the current display mode being used by the array controller to the content server 106. The content server 106 may thus filter the image data so that the image data for non-updated display elements is not sent. Thus, the total bandwidth consumed by the communicated data signal is reduced in proportion to the number of display elements that are not being updated at the fastest display rate. This reduction in data rate may further reduce power consumption associated with the display as the network interface 102 and the processor 21 have less data to process. In one embodiment, the content server 106 may determine the state, shade, or color for the less frequently updated subrows to display between updates and communicate that state to the processor 21.

In addition to varying the data rate based on the operational mode of the display, the content server 106 may also control or select the operational mode of the array 30. For example, based on information available to the content server 106 such as operational or power data associated with the display array 30 or controller 22, the content server 106 may send control data to the processor 21 for selecting the operational mode of the array 30. The content server 106 may also select the operational mode based on other data such as stored user preferences, rules associated with the content, or the desired rate of transfer of data on the network 104.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A system for displaying image data, said system comprising:

a display device having a plurality of operational modes, at least some of said operational modes corresponding to reduced display element resolution when displaying image data on the display device; and a source of image data configured to provide image data to said display device at a data rate that depends at least in part on the mode in which said display device is operating, wherein the plurality of operational mode includes a first operational mode and a second operational mode, wherein the second operational mode corresponds to reduced display element resolution as compared with the first operational mode, wherein the first operational mode includes displaying image data in a display region of the display device, and wherein the second operational mode includes displaying image data at a reduced display element resolution without changing the size of the display region.

2. The system of claim 1, wherein in at least one of said operational modes, said display device displays a reduced color gamut as compared to said first mode of operation.

3. The system of claim 1, further comprising a communications network, wherein said source of image data is configured to provide said image data over said communications network.

4. The system of claim 3, wherein said source of image data is configured to control said operational mode.

5. The system of claim 3, wherein said operational mode is selected based at least in part on a data rate of said communications network.

6. The system of claim 5, wherein said operational mode is selected based at least in part on a data rate utilized by said communications network.

7. The system of claim 3, wherein said operational mode is selected based at least in part on power data of the display device.

8. The system of claim 3, wherein said operational mode is selected based at least in part on stored user preferences.

9. The system of claim 3, wherein said communications network comprises a wireless communications network.

10. The system of claim 1, wherein in at least one of said operational modes, said display device displays a reduced gray scale as compared to said first mode of operation.

11. The system of claim 1, wherein said display device comprises a plurality of display elements and at least one of the said operational modes comprises re-setting display states of less than all of the display elements.

12. The system of claim 11, wherein the source of image data is further configured to provide a display state to re-set a remaining portion of the display elements.

13. The system of claim 11, wherein said less than all of the display elements comprise a first set of rows.

14. The system of claim 11, wherein the source of image data is further configured to provide filtered image data so that image data for the display elements that are not re-set is not provided.

15. The system of claim 14, wherein the source of image data is further configured to send the filtered image data the display device over a communications network.

16. The system of claim 1, wherein said image data comprises motion picture data.

17. A method for displaying image data, said method comprising:
re-setting a plurality of display elements in a first mode of operation to display image data,
re-setting less than all of the plurality of display elements in a second mode of operation to display image data, said second mode corresponding to a reduced display element resolution, and
receiving image data for display at a data rate that depends at least in part on the mode of operation being used,
wherein the first mode of operation includes displaying image data in a display region, and wherein the second mode of operation includes displaying image data at a reduced display element resolution as compared with the first mode without changing the size of the display region.

18. The method of claim 17, wherein the receiving comprises receiving image data over a communications network.

19. The method of claim 18, further comprising receiving control data for selecting the mode of operation.

20. The method of claim 17, wherein in the second mode, the method comprises displaying a reduced gray scale or a reduced color gamut as compared to displaying image data in the first mode.

21. The method of claim 17, wherein in the second mode, the method further comprises maintaining at least a portion of the display elements that were not re-set in a selected state.

22. The method of claim 21, wherein the selected state is selected based on an average brightness or color calculated over at least one image frame portion for at least some of the display elements that are re-set in the first mode.

23. The method of claim 17, wherein the display elements that are reset in the second mode of operation are distributed throughout the plurality of display elements.

24. A method of providing image data for display, said method comprising:
receiving data describing a current display mode being used by a display device, wherein the current display mode comprises updating display states of less than all display elements in the display device to provide a reduced display element resolution;
filtering image data for display on the display device; and
sending the filtered image data over a communications network,
wherein the filtering comprises filtering the image data so that image data for non-updated display elements is not sent,
wherein the display device has a first display mode different from the current display mode, wherein the current display mode corresponds to reduced display element resolution, wherein the first display mode includes displaying image data in a display region of the display device, and wherein the second display mode includes displaying image data at a reduced display element resolution as compared with the first display mode without changing the size of the display region.

25. The method of claim 24, further comprising sending control data over the communications network for selecting a display mode of the display device.

26. The method of claim 24, wherein the communications network comprises a wireless network, and wherein the sending comprises sending the filtered image data using at least one protocol selected from a code division multiple access protocol, a time division multiple access protocol, a frequency division multiple access protocol, and a Global System for Mobile Communications protocol.

27. An apparatus for displaying image data, the apparatus comprising:
an array of display elements having a plurality of operational modes, at least some of said operational modes corresponding to reduced display element resolution when displaying image data using the array;
a network interface configured to receive information from a content server over a communications network; and
an array controller configured to provide data to the array based on the information received from the content server,
wherein the plurality of operational modes includes a first operational mode and a second operational mode, wherein the second operational mode corresponds to reduced display element resolution, wherein the first operational mode includes displaying image data in a display region of the display device, and wherein the second operational mode includes displaying image data at a reduced display element resolution as compared with the first operational mode without changing the size of the display region.

28. The apparatus of claim 27, wherein the information comprises image data for display using the array.

29. The apparatus of claim 28, wherein the network interface receives the image data at a data rate that depends at least in part on the mode in which said array is operating.

30. The apparatus of claim 27, wherein the information comprises data for selecting the operational mode of the array.

31. The apparatus of claim 30, wherein the network interface is further configured to communicate data describing the mode in which said array is operating to the content server.

32. The apparatus of claim 27, wherein one of the operational modes corresponding to reduced display element resolution includes displaying at least one image frame on the array of display elements at a display element resolution which is less than a maximum display element resolution of the array.

* * * * *